US00RE44358E

(19) United States
(12) Reissued Patent
Bajko et al.

(10) Patent Number: US RE44,358 E
(45) Date of Reissued Patent: Jul. 9, 2013

(54) SUBSCRIBER REGISTRATIONS IN A MOBILE COMMUNICATION SYSTEM

(75) Inventors: Gabor Bajko, Budapest (FI); Gyorgy Wolfner, Budapest (FI)

(73) Assignee: Nokia Corporation, Espoo (FI)

(21) Appl. No.: 13/251,071

(22) Filed: Sep. 30, 2011

Related U.S. Patent Documents

Reissue of:

(64) Patent No.: 7,818,002
Issued: Oct. 19, 2010
Appl. No.: 10/476,980
PCT Filed: May 8, 2002
PCT No.: PCT/IB02/02696
§ 371 (c)(1),
(2), (4) Date: Dec. 31, 2003
PCT Pub. No.: WO02/091786
PCT Pub. Date: Nov. 14, 2002

(30) Foreign Application Priority Data

May 9, 2001 (GB) ..... 0111290.3

(51) Int. Cl.
*H04W 4/00* (2009.01)

(52) U.S. Cl.
USPC ..... 455/435.1; 455/411; 455/432.1; 455/435.2; 455/67.11; 455/442; 370/338; 370/352; 370/331

(58) Field of Classification Search
CPC ..... H04L 29/06197
USPC ..... 455/435.1–435.2, 433, 411; 370/338, 370/352
See application file for complete search history.

(56) References Cited

U.S. PATENT DOCUMENTS

| | | | |
|---|---|---|---|
| 4,775,999 | A | 10/1988 | Williams |
| 5,267,261 | A | 11/1993 | Blakeney, II et al. |
| 5,325,419 | A | 6/1994 | Connolly et al. |
| 5,379,447 | A | 1/1995 | Bonta et al. |
| 5,519,706 | A | 5/1996 | Bantz et al. |
| 5,629,975 | A | 5/1997 | Tiedemann, Jr. et al. |
| 5,764,730 | A | 6/1998 | Rabe et al. |
| 5,915,219 | A | 6/1999 | Poyhonen |
| 5,943,425 | A | 8/1999 | Mizikovsky |
| 5,953,652 | A | 9/1999 | Amin et al. |
| 6,151,495 | A | 11/2000 | Rune |
| 6,285,882 | B1 | 9/2001 | Cornillat et al. |
| 6,356,755 | B1 | 3/2002 | Valentine et al. |
| 6,385,448 | B1 | 5/2002 | Beckman et al. |
| 6,408,183 | B1 | 6/2002 | Woo |
| 6,463,286 | B1 | 10/2002 | Salminen |

(Continued)

FOREIGN PATENT DOCUMENTS

| | | | |
|---|---|---|---|
| EP | 1061670 | A1 | 12/2000 |
| JP | 10-126840 | A | 5/1998 |

(Continued)

OTHER PUBLICATIONS

3GPP TSG-SA Working Group 2 Drafting Session, "Re-registration/De-registration Information Flows", Oct. 9-12, 2000.

(Continued)

*Primary Examiner* — Sharad Ramipuria
(74) *Attorney, Agent, or Firm* — Mintz, Levin, Cohn, Ferris, Glovsky & Popeo, P.C.

(57) ABSTRACT

A method in a communication system wherein a user (1) is arranged to register with a control entity (22) comprises sending a message from the communication system to the user (1) requesting that the user re-register with said communication network. The user is caused to re-register with said network in response to said message.

114 Claims, 3 Drawing Sheets

U.S. PATENT DOCUMENTS

| | | | | |
|---|---|---|---|---|
| 6,493,552 | B1 | 12/2002 | Hicks | |
| 6,519,459 | B1 | 2/2003 | Chavez, Jr. et al. | |
| 6,587,882 | B1 | 7/2003 | Inoue et al. | |
| 6,594,490 | B1 | 7/2003 | Toyoda et al. | |
| 6,603,968 | B2 | 8/2003 | Anvekar et al. | |
| 6,628,948 | B1 | 9/2003 | Chavez, Jr. et al. | |
| 6,725,044 | B2 | 4/2004 | Verma et al. | |
| 6,763,233 | B2 | 7/2004 | Bharatia | |
| 6,785,223 | B1 | 8/2004 | Korpi et al. | |
| 6,816,729 | B1 | 11/2004 | Halonen | |
| 6,859,651 | B2 | 2/2005 | Gabor | |
| 7,003,294 | B2 | 2/2006 | Singhai et al. | |
| 7,003,295 | B1 | 2/2006 | Cook et al. | |
| 7,082,297 | B2 | 7/2006 | Tuomi et al. | |
| 7,162,236 | B2 * | 1/2007 | Dorenbosch et al. | 455/432.1 |
| 7,184,418 | B1 | 2/2007 | Baba et al. | |
| 7,746,836 | B2 * | 6/2010 | Jentz et al. | 370/338 |
| 7,818,002 | B2 * | 10/2010 | Bajko et al. | 455/435.1 |
| 8,180,878 | B2 * | 5/2012 | Lindholm et al. | 709/223 |
| 8,213,394 | B2 * | 7/2012 | Coulas et al. | 370/338 |
| 2001/0012777 | A1 | 8/2001 | Igarashi et al. | |
| 2003/0224795 | A1 | 12/2003 | Wilhoite et al. | |
| 2004/0097216 | A1 | 5/2004 | Mademann | |
| 2004/0185848 | A1 * | 9/2004 | Phan-Anh et al. | 455/435.1 |
| 2006/0047829 | A1 | 3/2006 | Acharya et al. | |
| 2006/0223531 | A1 | 10/2006 | Hanson | |
| 2010/0232407 | A1 * | 9/2010 | Navali et al. | 370/338 |

FOREIGN PATENT DOCUMENTS

| | | | |
|---|---|---|---|
| JP | 11-161618 | A | 6/1999 |
| JP | 11-234748 | A | 8/1999 |
| JP | 11-239089 | A | 8/1999 |
| JP | 11-355858 | A | 12/1999 |
| RU | 2154359 | C2 | 8/2000 |
| RU | 2154905 | C1 | 8/2000 |
| WO | WO 98/59513 | | 12/1998 |
| WO | WO-9859513 | A1 | 12/1998 |
| WO | WO 00/08884 | | 2/2000 |
| WO | WO-0008884 | A1 | 2/2000 |
| WO | WO-00/79760 | A1 | 12/2000 |
| WO | WO 00/79760 | A1 | 12/2000 |
| WO | WO-0131472 | A1 | 5/2001 |
| WO | WO-01/78439 | A2 | 10/2001 |

OTHER PUBLICATIONS

English translation of Japanese Office Action, Japanese Patent Application No. JP2002-588715, Nov. 9, 2007.

English translation of Japanese Office Action, Japanese Patent Application No. JP2002-588715, Oct. 27, 2008.

"Mobile IP", C. E. Perkins, IEEE Communications Magazine, IEEE Service Center, vol. 35, No. 5, May 1, 1997, pp. 84-86, 91-99, XP000657114.

Japanese Office Action, Japanese Patent Application No. JP 2002-588715, Date of Issue: Nov. 9, 2007, pp. 1-3, English Translation: pp. 1-3.

Japanese Office Action, Japanese Patent Application No. JP 2002-588715, Date of Issue: Oct. 20, 2008, Date of Dispatch: Oct. 27, 2008, English Translation: pp. 1-2.

* cited by examiner

SUBSCRIBER REGISTRATIONS IN A MOBILE COMMUNICATION SYSTEM

Matter enclosed in heavy brackets [ ] appears in the original patent but forms no part of this reissue specification; matter printed in italics indicates the additions made by reissue.

FIELD OF THE INVENTION

The present invention relates to a communication system, and in particular, but not exclusively, to a communication system wherein a user is arranged to be registered and/or authenticated with the system.

BACKGROUND OF THE INVENTION

A communication system can be seen as a facility that enables communication between two or more entities such as user equipment and/or other nodes associated with the system. The communication may comprise, for example, communication of voice, data, multimedia and so on.

A communication system typically operates in accordance with a given standard or specification which sets out what the various elements of the system are permitted to do and how that should be achieved. For example, the standard or specification may define if the user, or more precisely, user equipment or terminal is provided with a circuit switched service and/or a packet switched service. Communication protocols and/or parameters which shall be used for the connection may also be defined. In other words, a specific set of "rules" on which the communication can be based on needs to be defined to enable communication by means of the system.

Communication systems providing wireless communication for user terminals or other nodes are known. An example of the wireless systems is a cellular network. In cellular systems, a base transceiver station (BTS) or similar access entity serves mobile stations (MS) or similar user equipment (UE) via a wireless interface between these entities. The operation of the apparatus required for the communication can be controlled by one or several control entities. The various control entities may be interconnected. One or more gateway nodes may also be provided for connecting the cellular network to other networks, such as to another cellular system or to a public switched telephone network (PSTN) and/or other communication networks such as an IP (Internet Protocol) and/or other packet switched networks. The communication between the user equipment and the elements of the communication network can be based on an appropriate communication protocol such as the session initiation protocol (SIP).

For example, in the current third generation (3G) multimedia network architectures it is assumed that various servers are used for handling different functions. These include functions such as call state control functions (CSCFs). A call state control function entity may provide functions such as proxy call state control (P-CSCF), interrogating call state control (I-CSCF), and serving call state control (S-CSCF). The serving call state control function can be divided further between originating call state control function (O-CSCF) and terminating call state control function (T-CSCF) at the originating and terminating ends of a session, respectively. Control functions may also be provided by entities such as a home subscriber server (HSS) and various application servers.

From the above mentioned control entities the home subscriber server (HSS) is for storing subscriber related information. The subscriber information may include data such as registration identities (ID) of the subscriber or the terminals and so on. The home subscriber server (HSS) can be queried by other function entities, e.g. during registration and session set-up procedures. It shall be appreciated that the term "session" refers to any communication a user may have such as to a call, data (e.g. web browsing) or multimedia communication and so on.

A user in communication with an access entity of the communication system may be registered in a serving controller entity such as in a S-CSCF. During registration proceedings various authentication queries or messages and authentication parameters such as those based on authentication quintets and/or keys may be transferred between the entities involved in the process. A user may have more than one registration at the same time. The registration is required for communication via the communication system.

During a registration procedure a user identifier such as a public ID is provided for the controller entity. Public ID is an identifier of a user of the communication system and the basic function thereof corresponds a telephone number of the known telephone systems. A 3G phone may have more than one identifier (e.g. a telephone number, one or more email-like addresses, for example session initiation protocol (SIP) universal resource locators (URL), an address or addresses for alternative communications means, and so on).

Once a public ID is registered it is stored both in a P-CSCF and S-CSCF. An expiration timer is associated with the stored public ID. The timer functions such that when the expiration timer expires the registration of that specific public ID becomes invalid.

In the IP multimedia subsystem IMS currently proposed by the third generation standards, the subscriber is authenticated at registration and can be re-authenticated if the subscriber re-registers. However, the inventors have appreciated that from time to time, events occur in the network which require the re-registration and/or re-authentication of the subscriber. For example:

- the length of time for which a subscriber can be registered to the network has a time limit. If the subscriber does not re-register in time, the subscriber becomes unregistered. This can have the result, for example that ongoing calls must be dropped and the subscriber becomes unavailable;
- the network becomes distrustful of the subscriber (for example the subscriber is making a very long call) and would like to re-authenticate the user during the call; and
- there is an error condition in the S-CSCF (for example congestion, overloading or the like etc.) and S-CSCF would like to force the user to use another S-CSCF.

It has been suggested that the user should send periodic re-registration messages to the network. This allows re-authentication also to be performed. This does not deal with the problems which arise when the network is suspicious of a user. The network has to wait for the next re-registration message. Again if a change in the S-CSCF is required, again the network must wait for the next re-registration message.

If the re-registration messages are too frequent, then network resources may be used unnecessarily.

It has also been proposed that the session initiation protocol SIP allow for the authentication or re-authentication of a subscriber when he/she sends a new SIP request (e.g., INVITE). However forcing authentication when an INVITE has been received would unacceptably increase the session set-up time.

The subscriber can be de-registered. A notification is sent to the subscriber about this if there is a subscription for the notification. On receipt of this notification, the user can re-register. This has the disadvantage that any ongoing calls will be dropped.

It shall be appreciated that although the above discussed the registration proceedings and related problems with reference to an internet protocol (IP) based third generation (3G) communication system and session initiation protocol (SIP), similar disadvantages may associate with other systems as well and thus the description is not limited to these examples.

SUMMARY OF THE INVENTION

Embodiments of the present invention aim to address one or more of the above problems.

According to a first aspect of the present invention there is provided a method in a communication system wherein a user is arranged to register with a control entity, said method comprising the steps of sending a message from the communication system to the user requesting that the user re-register with said communication network and causing said user to re-register with said network in response to said message.

According to a second aspect of the present invention there is provided a method in a communication system wherein a user is arranged to register with a control entity, said method comprising the steps of sending a message from the communication system to the user requesting that the user re-register with said communication network and causing said user to re-register with said network in response to said message, said re-registration procedure authenticating said user.

According to a third aspect of the present invention there is provided a method in a communication system wherein a user is arranged to register with a control entity, said method comprising the steps of sending a message from the communication system to the user requesting that the user initiate a procedure with said communication network, said procedure causing re-authentication of said user causing said user to initiate said procedure in response to said message and re-authenticating said user.

According to a fourth aspect of the present invention there is provided a communication system comprising at least one user and a control entity, the user being arranged to be registered with a control entity in use, said communication being arranged to send a message from the communication system to the user requesting that the user re-register with said communication network, said user being arranged to re-register with said network in response to said message.

BRIEF DESCRIPTION OF DRAWINGS

For better understanding of the present invention, reference will now be made by way of example only to the accompanying drawings in which.

DESCRIPTION OF PREFERRED EMBODIMENTS OF THE INVENTION

Figure 1:
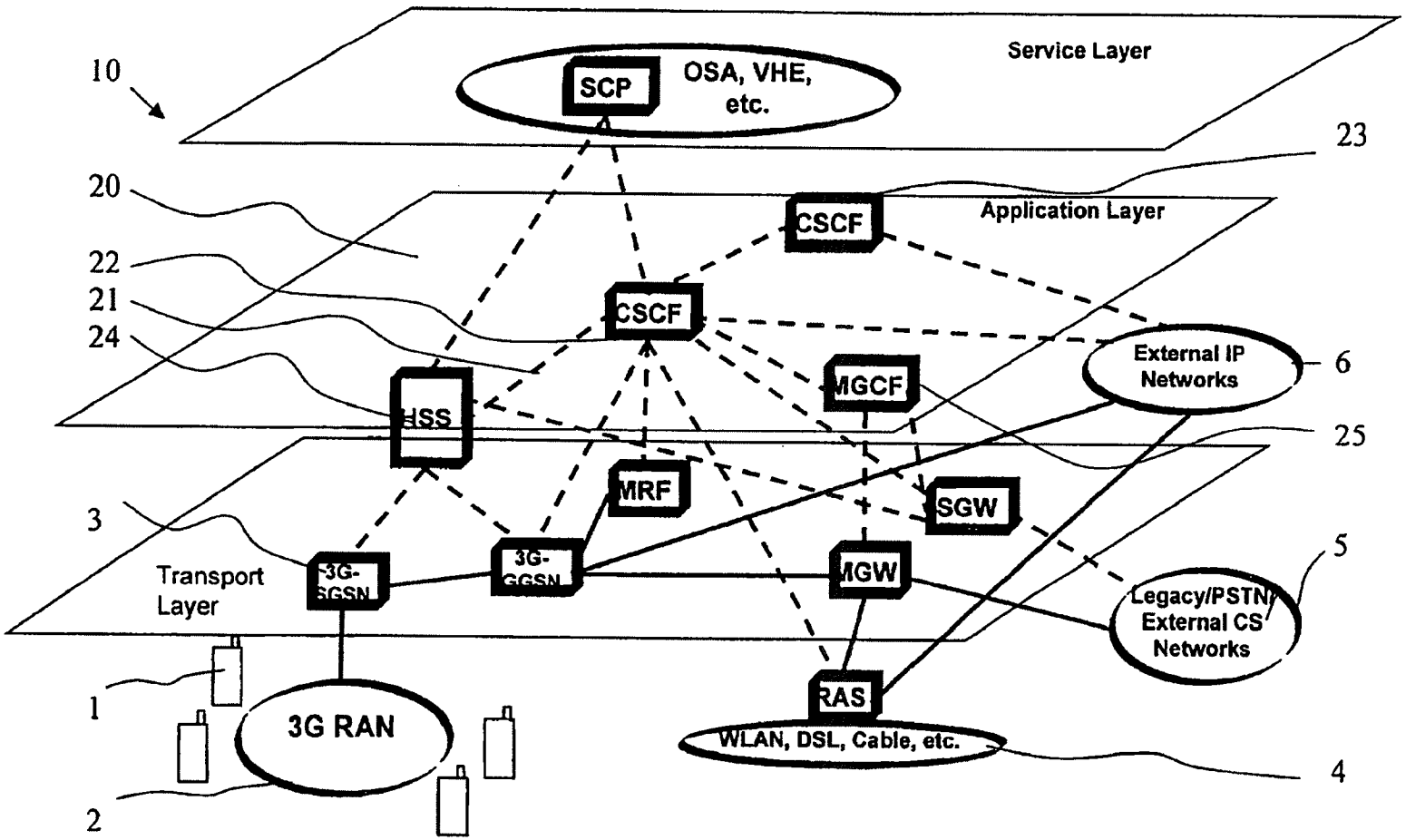
FIG. 1 shows a communication system architecture wherein the present invention can be embodied.

Reference is first made to FIG. 1 which shows a possible network architecture wherein the present invention may be embodied. The exemplifying network system 10 is arranged in accordance with UMTS 3G specifications. The cellular system 10 is divided between a radio access network (RAN) 2 and a core network (CN).

In general terms, it is possible to describe a communication system as a model in which the functions of the system are divided in several hierarchically arranged function layers. FIG. 1 shows three different function layers, i.e. a service layer, an application layer and a transport layer and the positioning of various network elements relative to these layers. It shall be appreciated that the layered model is shown only in order to illustrate the relationships between the various functions of a data communication system. In a physical i.e. real implementation the entities (e.g. servers or other nodes) are typically not arranged in a layered manner.

A plurality of user equipment 1 is served by a 3G radio access network (RAN) 2 over a wireless interface. The user equipment is enabled to move relative to the access entity, and may thus be referred to by the term mobile station. The radio access network function is hierarchically located on the transport layer. It shall be appreciated that although FIG. 1 shows only one radio access network for clarity reasons, a typical communication network system comprises a number of radio access networks.

The 3G radio access network (RAN) 2 is shown to be physically connected to a serving general packet radio service support node (SGSN) entity 3. The SGSN 3 is a part of the core network. In the functional model the entity 3 belongs to the transport layer. The operation of a typical cellular network and the various transport level entities thereof is known by the skilled person and will thus not be explained in more detail herein.

An application layer 20 is shown to be located on top of the transport layer. The application layer 20 may include several application level functions. FIG. 1 shows two call state control entities (CSCFs) 22 and 23. For a given one of the user equipment, one of these call state servers 22 is the so called serving call state control function (S-CSCF) to which the user equipment 1 is registered. That is, the server 22 which is currently serving said user equipment 1 and is in control of the status of the user equipment.

The application layer is also shown to comprise a home subscriber server (HSS) entity 24. The home subscriber server (HSS) 24 is for storing data such as the registration identifiers (ID), their status (currently-registered-with-S-CSCF1 or currently-not-registered) and similar user related information.

For the sake of completeness some other elements such as various gateway entities (e.g. the Media Gateway Control Function MGCF, Media Gateway MGW and the Signalling Gateway SGW) are also shown. However, these do not form an essential part of the invention and will thus not be described in more detail.

The solid lines indicate actual data communication between various entities. The dashed lines indicate signalling traffic between various entities. The signalling is typically required for management and/or control functions, such as for registration, session set-up, charging and so on. As can be seen, user equipment 1 may have communication via the access network 2 and appropriate gateways with various other networks such as networks 4, 5 and 6. The other networks may be adapted to operate in accordance with the same standard as the network 10 or any other appropriate standard.

Figure 2:
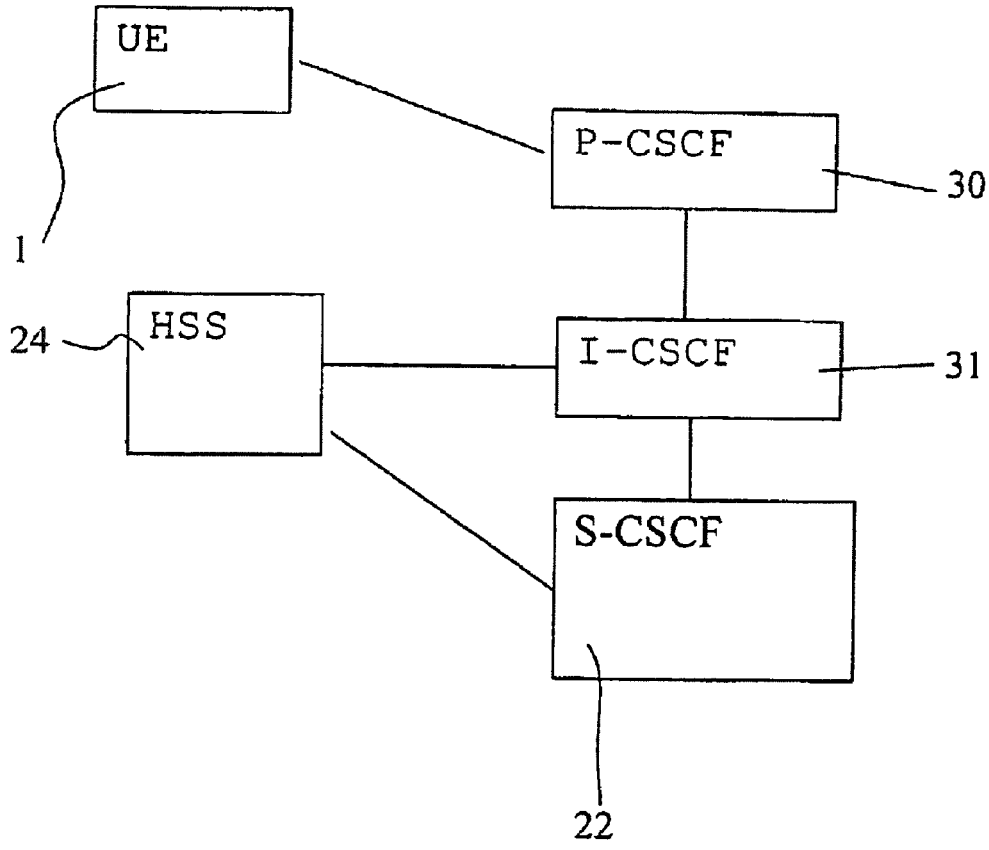
FIG. 2 shows an embodiment.

FIG. 2 shows in more detail the serving controller entitie 22. Further controller entities such as a proxy CSCF 30 and an interrogating CSCF 31 are also shown. Also shown is the HSS.

In the registration procedure, the user equipment 1 sends a request for registration to a proxy server entity 30. The registration request is forwarded to an interrogating server entity 31. An appropriate query procedure may then be accomplished between the interrogating server entity 31 and the subscriber information database HSS 24. The interrogating server may then request registration from the serving controller entity 22. The public identifier associated with the request is registered at the serving controller entity 22. Acknowledgement messages may then be signalled in any appropriate manner. Authentication takes place as well.

The embodiment of the invention allows the network side (that is not the user equipment of the IP Multimedia Subsystem (IMS)) to trigger the re-registration of IMS subscribers (i.e. the user equipment).

Figure 3:
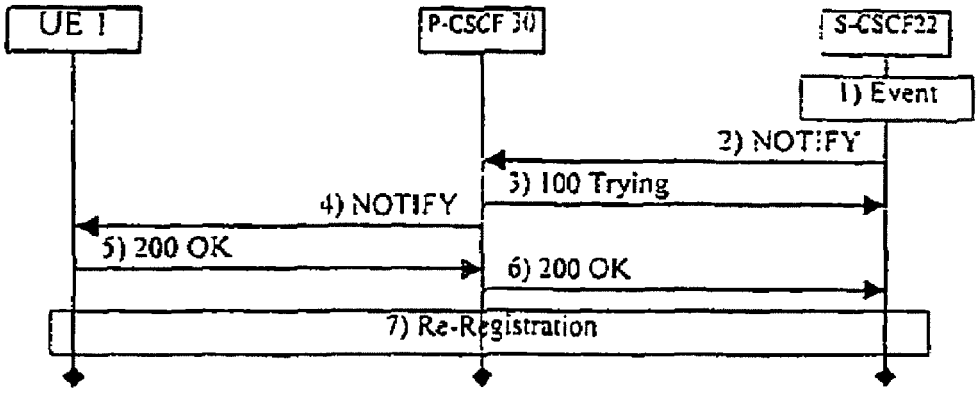
FIG. 3 shows information flows in accordance with an embodiment of the present invention.

A method for triggering the re-registration of IMS subscribers (that is user equipment) by the S-CSCF will now be described with reference to FIG. 3.

An "event" "1" happens in the network that requires a re-registration and/or re-authentication of the subscriber. This event could be any one or more of the following: the current registration expires; the network becomes suspicious of the user (for example because of a very long call, a change in the pattern of usage or for any other reason); or there is an error condition in the S-CSCF (for example there is congestion in the current S-CSCF or it is overloaded, etc.) and the S-CSCF would like to force the user to use another S-CSCF. It should be appreciated that any other event may requires re-registration or re-authentication in alternative embodiments of the invention.

In response to the event, the S-CSCF sends a NOTIFY request in step "2" TO THE proxy CSCF 30. The NOTIFY message would only be sent to the user equipment if the equipment subscribed to this service beforehand. It alternative embodiments of the invention, it may not be necessary for the user equipment to subscribe to this service. The NOTIFY request is a message that contains asynchronous notification about events.

In the request sent by the S-CSCF 22 sent to the P-CSCF, the event header contains an event which would trigger a re-registration in a 3GPP compliant user equipment 1. The name of the event could be "org.3gpp.reginit" or any other suitable name. The NOTIFY message contains a standardized name of the event that caused the notification. IANA (Internet Assigned Number Authority) is the standardization body where the name of the event may be registered. The name may be registered with an alternative standardization body. In alternative embodiments of the invention, the name may not be registered with a standardization body and may for example be specific to a particular service provider or the like.

Upon receiving the request the P-CSCF 30 sends a 100 Trying message in step "3". This message informs the S-CSCF 22 that the P-CSCF 30 has received the message and is trying to forward the message to the UE 1.

The P-CSCF 30 forwards the NOTIFY request to the user equipment 1 in step "4".

In step "5", the user equipment 1 UE replies to the P-CSCF 30 that the request is accepted.

In step "6" the P-CSCF 30 forwards the reply to the S-SCSF 22.

Finally the user equipment starts a normal re-registration procedure in step 7. This re-registration procedure is defined in the current version of the third generation standard. In this re-registration procedure, re-authentication of the user equipment will take place.

In this embodiment, one user equipment is informed that a re-registration is needed in order to or to continue to be able to use the services offered by the network. It is possible that a group of user equipment may be forced to re-register using this same method.

An advantage of the embodiment of the present invention described hereinbefore is that existing sessions are not dropped, since the network can inform the user equipment that a re-registration is needed in order to or continue to be able to use the services offered by the network. Using embodiments of this invention the network would be able to authenticate subscribers during an ongoing call, to authenticate subscribers before receiving a call, etc. Subscribers can be authenticated during a call. The network does not have to drop the existing sessions if the registration of a subscriber becomes invalid, it can try to trigger a re-registration first, a procedure which requires re-authentication. Subscribers can reregister with a new S-CSCF without interrupting a call. This could be done by causing the user equipment to send a re-register message as described in relation to FIG. 3. During the registration procedure, the I-CSCF 31 could select a new S-CSCF. In this way the whole network problem will be invisible for the subscribers that have no active session. Malfunctioning user equipment can be reminded to send a re-registration message before the expire timer expires.

In the described embodiment, triggering the re-registration of a subscriber is done by using the existing NOTIFY method defined in the third generation standard. A new event name should be defined in order cause this triggering. In the preferred embodiment, this name is "org.3gpp.reginit" but any other suitable name may be used.

In order to get the notification requiring re-registration, the user equipment should subscribe to this type of notification at registration by inserting an appropriate header in the registration message. If the user equipment does not subscribe to this event then just before the expire timer expires, malfunctioning user equipment will not be reminded to send a re-registration message. This will result in the user being de-registered from the network, which would result in the dropping the ongoing sessions. Without subscribing to this service, when the network becomes distrustful the user will be simply de-registered from the network. If there is an ongoing session that will be dropped If there is an error condition in S-CSCF the user will be deregistered and possibly notified about the action. A possible ongoing session will be dropped.

All call drops could be avoided in the above mentioned situations if user subscribes to this new event. In alternative embodiments of the invention, the user equipment can be controlled to re-register as outlined in FIG. 3 without requiring the user equipment to subscribe to the service. The service is thus always available.

In the IMS the subscriber is authenticated at registration and is re-authenticated at re-registration. It is possible that some event happens in the network that would require the re-registration and/or re-authentication of the subscriber.

It should be appreciated that whilst embodiments of the present invention have been described in relation to user equipment such as mobile stations, embodiments of the present invention are applicable to any other suitable type of user equipment The embodiments of the invention were discussed with reference to call state control function entities. Embodiments of the present invention can be applicable to other network elements where applicable.

The embodiment of the present invention has been described in the context of the Universal Mobile Telecommunication System (UMTS) 3G system. This invention is also applicable to any other communication systems and protocols. Examples of other systems, without limiting to these, include the General Packet Radio Service (GPRS), the Enhanced Data rate for GSM Evolution (EDGE) mobile data network, other third generation (3G) telecommunication systems such as the i-phone or IMT-2000 (International Mobile Telecommunications) and the Terrestrial Trunked Radio (TETRA) system.

It is also noted herein that while the above describes exemplifying embodiments of the invention, there are several variations and modifications which may be made to the disclosed solution without departing from the scope of the present invention as defined in the appended claims.

The invention claimed is:

1. A method, comprising:

registering a user equipment with a control entity in a communication system, said control entity implemented as a serving call state control function;

sending a message from the communication system to the user equipment requesting that the user equipment re-register with said communication system, the sending is responsive to at least one of a plurality of specified conditions, the plurality of specified conditions comprising one or more of the following:

a current registration of the user equipment is set to expire in a predetermined time;

one or more error conditions in the communication system;

one or more error conditions in the control entity; and the communication system mistrusts the user equipment; and causing said user equipment to re-register with said communication system in response to said message wherein said user equipment is re-authenticated when said user equipment is re-registered, wherein re-registration of said user equipment is carried out without dropping existing sessions associated with the user equipment.

2. The method of claim 1, wherein the sending the message is performed by said control entity.

3. The method of claim 1, wherein the sending said message is responsive to an occurrence of one or more specified conditions.

4. The method of claim 1, further comprising: configuring the control entity error conditions to comprise one or more of the following conditions:

congestion in said system; and overloading in said system.

5. The method of claim 1, wherein the sending the user equipment said message is performed conditioned on whether the user equipment subscribes to a service providing said message.

6. The method of claim 1, wherein the sending the message comprises sending the message to the user equipment from the control entity via an intermediate control entity.

7. The method of claim 6, further comprising:

configuring said intermediate control entity to be a proxy call state control function.

8. The method of claim 1, further comprising:

sending, by said user equipment, a re-registration request in response to said message.

9. A method, comprising:

authenticating a user equipment with a control entity in a communication system, said control entity implemented as a serving call state control function;

sending a message from the communication system to the user equipment requesting that the user equipment initiate a procedure with said communication system, said procedure causing re-authentication of said user equipment, the sending is responsive to at least one of a plurality of specified conditions, the plurality of specified conditions comprising one or more of the following:

a current registration of the user equipment is set to expire in a predetermined time;

one or more error conditions in the communication system;

one or more error conditions in the control entity; and the communication system mistrusts the user equipment;

causing said user equipment to initiate said procedure in response to said message; and re-authenticating said user equipment, wherein said procedure is carried out without dropping existing sessions associated with the user equipment.

10. The method of claim 9, wherein the sending the message is performed by said control entity.

11. The method of claim 9, wherein the sending said message is responsive to an occurrence of one or more specified conditions.

12. The method of claim 9, further comprising:

configuring the control entity error conditions to comprise one or more of the following conditions:

congestion in said system; and overloading in said system.

13. The method of claim 9, wherein the sending the user equipment said message is conditioned on whether the user equipment subscribes to a service providing said message.

14. The method of claim 9, wherein the sending the message comprises sending the message to the user equipment from the control entity via an intermediate control entity.

15. The method of claim 14, further comprising:

configuring said intermediate control entity to be a proxy call state control function.

16. The method of claim 9, further comprising:

configuring said communication system to be a third generation communications network.

17. The method of claim 9, further comprising:

configuring said message to be a session initiation protocol NOTIFY message.

18. A system, comprising:

a user equipment; and a control entity, said control entity implemented as a serving call state control function, wherein the user equipment is configured to be registered with the control entity, wherein said communication system is configured to send a message to the user equipment requesting that the user equipment re-register with said communication system, the message is sent in response to at least one of a plurality of specified conditions, the plurality of specified conditions comprising one or more of the following:

a current registration of the user equipment is set to expire in a predetermined time;

one or more error conditions in the communication system;

one or more error conditions in the control entity; and the communication system mistrusts the user equipment wherein said user equipment is configured to re-register with said communication system in response to said message, wherein said user equipment is re-authenticated when said user equipment is re-registered, and wherein said communication system is configured to carry out re-registration of said user equipment without dropping existing sessions associated with the user equipment.

19. The communication system of claim 18, wherein the user equipment comprises a mobile user equipment.

20. The system of claim 18, wherein said control entity is configured to send said message.

21. The system of claim 18, wherein said message is configured to be sent in response to an occurrence of one or more specified conditions.

22. The system of claim 18, wherein the control entity error conditions comprise one or more of the following conditions:

congestion in said system; and overloading in said system.

23. The system of claim 18, wherein the message is configured to be sent to the user equipment conditioned upon whether the user equipment subscribes to a service providing said message.

24. The system of claim 18, wherein the control entity is configured to send the message to the user equipment via an intermediate control entity.

25. The system of claim 24, wherein said intermediate control entity is a proxy call state control function.

26. The system of claim 18, wherein said user equipment is configured to send a re-registration request in response to said message.

27. The system of claim 18, wherein said communication system is a third generation communications network.

28. The system of claim 18, wherein said message is a session initiation protocol NOTIFY message.

29. An apparatus, comprising:

a processor configured to register a user equipment with a control entity in a communication system, said control entity implemented as a serving call state control function; and a transmitter configured to send a message to the user equipment requesting that the user equipment re-register with the communication system, the message is sent in response to at least one of a plurality of specified conditions, the plurality of specified conditions comprising one or more of the following:

a current registration of the user equipment is set to expire in a predetermined time;

one or more error conditions in the communication system;

one or more error conditions in the control entity; and the communication system mistrusts the user equipment, wherein the message is configured to trigger the user equipment to re-register with the communication system in response to the message, without requiring said user equipment to drop existing sessions associated with said user equipment.

30. An apparatus, comprising:

registration means for registering a user equipment with a control entity in a communication system, said control entity implemented as a serving call state control function; and sender means for sending a message to the user equipment requesting that the user equipment re-register with the communication system, the message is sent in response to at least one of a plurality of specified conditions, the plurality of specified conditions comprising one or more of the following:

a current registration of the user equipment is set to expire in a predetermined time;

one or more error conditions in the communication system;

one or more error conditions in the control entity; and the communication system mistrusts the user equipment, wherein the message is configured to trigger the user equipment to re-register with the communication system in response to the message, without requiring said user equipment to drop existing sessions associated with said user equipment.

31. A method, comprising:

receiving a message, at a user equipment in a communication system wherein the user equipment is configured to register with a control entity implemented as a serving call state control function, from the communication system requesting that the user equipment re-register with said communication network, the message is received in response to at least one of a plurality of specified conditions, the plurality of specified conditions comprising one or more of the following:

a current registration of the user equipment is set to expire in a predetermined time;

one or more error conditions in the communication system;

one or more error conditions in the control entity; and the communication system mistrusts the user equipment; and causing said user equipment to re-register with said network in response to said message wherein said user equipment is re-authenticated when said user equipment is re-registered, wherein re-registration of said user equipment is carried out without dropping existing sessions associated with said user equipment.

32. An apparatus, comprising:

a processor of a user equipment configured to operate in a communication system, wherein said user equipment is configured to be registered with a control entity in operation, the control entity implemented as a serving call state control function;

a receiver configured to receive a message from the communication network requesting that the user equipment re-register with said communication network, the message is received in response to at least one of a plurality of specified conditions, the plurality of specified conditions comprising one or more of the following:

a current registration of the user equipment is set to expire in a predetermined time;

one or more error conditions in the communication system;

one or more error conditions in the control entity; and the communication system mistrusts the user equipment;

wherein said processor is configured to re-register said user equipment with said network in response to said message, wherein said user equipment is re-authenticated when said user equipment is re-registered, and wherein said processor is configured to re-register the user equipment with the network without dropping existing sessions associated with the user equipment.

33. The apparatus of claim 29, wherein the user equipment comprises a mobile user equipment.

34. The apparatus of claim 29, wherein said message is configured to be sent in response to an occurrence of one or more specified conditions.

35. The apparatus of claim 29, wherein the error conditions comprise one or more of the following conditions:

congestion in said system; and overloading in said system.

36. The apparatus of claim 29, wherein the message is configured to be sent to the user equipment conditioned upon whether the user equipment subscribes to a service providing said message.

37. The apparatus of claim 29, wherein the apparatus is configured to send the message to the user equipment via an intermediate control entity.

38. The apparatus of claim 37, wherein said intermediate control entity is a proxy call state control function.

39. The apparatus of claim 29, wherein said user equipment is configured to send a re-registration request in response to said message.

40. The apparatus of claim 29, wherein said communication system is a third generation communications network.

41. The apparatus of claim 29, wherein said message is a session initiation protocol NOTIFY message.

42. The apparatus of claim 32, wherein the user equipment comprises a mobile user equipment.

43. The apparatus of claim 32, wherein said control entity is configured to send said message.

44. The apparatus of claim 32, wherein said message is configured to be sent in response to an occurrence of one or more specified conditions.

45. The apparatus of claim 32, wherein the control entity error conditions comprise one or more of the following conditions:

congestion in said system; and overloading in said system.

46. The apparatus of claim 32, wherein the message is configured to be sent to the user equipment conditioned upon whether the user equipment subscribes to a service providing said message.

47. The apparatus of claim 32, wherein the control entity is configured to send the message to the user equipment via an intermediate control entity.

48. The apparatus of claim 47, wherein said intermediate control entity is a proxy call state control function.

49. The apparatus of claim 32, wherein said user equipment is configured to send a re-registration request in response to said message.

50. The apparatus of claim 32, wherein said communication system is a third generation communications network.

51. The apparatus of claim 32, wherein said message is a session initiation protocol NOTIFY message.

52. A computer-readable medium encoded with instructions that, when executed on a computer, perform a process, the process comprising:

registering a user equipment with a control entity in a communication system, the control entity implemented as a serving call state control function;

sending a message from the communication system to the user equipment requesting that the user equipment re-register with said communication system, the sending is responsive to at least one of a plurality of specified conditions, the plurality of specified conditions comprising one or more of the following:

a current registration of the user equipment is set to expire in a predetermined time;

one or more error conditions in the communication system;

one or more error conditions in the control entity; and the communication system mistrusts the user equipment; and causing said user equipment to re-register with said communication system in response to said message wherein said user equipment is re-authenticated when said user equipment is re-registered, wherein re-registration of said user equipment is carried out without dropping existing sessions associated with the user equipment.

53. A computer-readable medium encoded with instructions that, when executed on a computer, perform a process, the process comprising:

authenticating a user equipment with a control entity in a communication system, the control entity implemented as a serving call state control function;

sending a message from the communication system to the user equipment requesting that the user equipment initiate a procedure with said communication system, said procedure causing re-authentication of said user equipment, the sending is responsive to at least one of a plurality of specified conditions, the plurality of specified conditions comprising one or more of the following:

a current registration of the user equipment is set to expire in a predetermined time;

one or more error conditions in the communication system;

one or more error conditions in the control entity; and the communication system mistrusts the user equipment;

causing said user equipment to initiate said procedure in response to said message; and re-authenticating said user equipment, wherein said procedure is carried out without dropping existing sessions associated with the user equipment.

54. A computer-readable medium encoded with instructions that, when executed on a computer, perform a process, the process comprising:

receiving a message, at a user equipment in a communication system wherein the user equipment is configured to register with a control entity implemented as a serving call state control function, from the communication system requesting that the user equipment re-register with said communication network, the message is received in response to at least one of a plurality of specified conditions, the plurality of specified conditions comprising one or more of the following:

a current registration of the user equipment is set to expire in a predetermined time;

one or more error conditions in the communication system;

one or more error conditions in the control entity; and the communication system mistrusts the user equipment; and causing said user equipment to re-register with said network in response to said message wherein said user equipment is re-authenticated when said user equipment is re-registered, wherein re-registration of said user equipment is carried out without dropping existing sessions associated with said user equipment.

*55. A method, comprising:*

*sending, by a user equipment, a registration message to register the user equipment with a control entity in a communication system, the control entity implemented as a serving call state control function;*

*receiving at the user equipment a message requesting the user equipment to re-register with the communication system, wherein the message is responsive to at least one of a plurality of specified conditions; and*

*causing, in response to the message, the user equipment to re-register with the control entity in the communication system, wherein the user equipment is re-authenticated when the user equipment is re-registered,*

*wherein the re-registration of the user equipment is carried out without dropping existing sessions associated with the user equipment.*

*56. The method of claim 55, wherein the message comprises a session initiation protocol NOTIFY message.*

*57. The method of claim 55, wherein the re-registration further comprises the re-authentication.*

*58. A method, comprising:*

*sending, by a user equipment, a registration message to register the user equipment with a control entity in a communication system, the control entity implemented as a serving call state control function;*

*receiving at the user equipment a message requesting the user equipment to re-register with the communication system, wherein the message is responsive to at least a current registration of the user equipment set to expire in a predetermined time; and*

*causing, in response to the message, the user equipment to re-register with the control entity in the communication system, wherein the user equipment is re-authenticated when the user equipment is re-registered,*

*wherein the re-registration of the user equipment is carried out without dropping existing sessions associated with the user equipment.*

*59. The method of claim 58, wherein the message comprises a session initiation protocol NOTIFY message.*

*60. The method of claim 58, wherein the re-registration further comprises the re-authentication.*

*61. A method, comprising:*

*sending, by a user equipment, a registration message to register the user equipment with a control entity in a communication system, the control entity implemented as a serving call state control function;*

*receiving at the user equipment a message requesting the user equipment to re-register with the communication system, wherein the message responsive to at least one or more error conditions in the communication system; and*

*causing, in response to the message, the user equipment to re-register with the control entity in the communication system, wherein the user equipment is re-authenticated when the user equipment is re-registered,*

*wherein the re-registration of the user equipment is carried out without dropping existing sessions associated with the user equipment.*

*62. The method of claim 61, wherein the message comprises a session initiation protocol NOTIFY message.*

*63. The method of claim 61, wherein the re-registration further comprises the re-authentication.*

*64. A method, comprising:*

*sending, by a user equipment, a registration message to register the user equipment with a control entity in a communication system, the control entity implemented as a serving call state control function;*

*receiving at the user equipment a message requesting the user equipment to re-register with the communication system, wherein the message is responsive to at least one or more error conditions in the control entity; and*

*causing, in response to the message, the-user equipment to re-register with the control entity in the communication system, wherein the user equipment is re-authenticated when the user equipment is re-registered,*

*wherein the re-registration of the user equipment is carried out without dropping existing sessions associated with the user equipment.*

*65. The method of claim 64, wherein the message comprises a session initiation protocol NOTIFY message.*

*66. The method of claim 64, wherein the re-registration further comprises the re-authentication.*

*67. A method, comprising:*

*sending, by a user equipment, a registration message to register the user equipment with a control entity in a communication system, the control entity implemented as a serving call state control function;*

*receiving at the user equipment a message requesting the user equipment to re-register with the communication system, wherein the message is responsive to at least the control entity mistrusting the user equipment; and*

*causing, in response to the message, the user equipment to re-register with the control entity in the communication system, wherein the user equipment is re-authenticated when the user equipment is re-registered,*

*wherein the re-registration of the user equipment is carried out without dropping existing sessions associated with the user equipment.*

*68. The method of claim 67, wherein the message comprises a session initiation protocol NOTIFY message.*

*69. The method of claim 67, wherein the re-registration further comprises the re-authentication.*

*70. An apparatus, comprising:*

*a transmitter configured to send a registration message to register a user equipment with a control entity in a communication system, the control entity implemented as a serving call state control function; and*

*a receiver configured to receive, at the user equipment, a message requesting the user equipment to re-register with the communication system, wherein the message is responsive to at least one of a plurality of specified conditions, wherein the transmitter is configured to cause, in response to the message, the user equipment to re-register with the control entity in the communication system, wherein the user equipment is re-authenticated when the user equipment is re-registered, wherein the re-registration of the user equipment is carried out without dropping existing sessions associated with the user equipment.*

*71. The apparatus of claim 70, wherein the message comprises a session initiation protocol NOTIFY message.*

*72. The apparatus of claim 70, wherein re-registration comprises re-authentication.*

*73. An apparatus, comprising:*

*a transmitter configured to send a registration message to register a user equipment with a control entity in a communication system, the control entity implemented as a serving call state control function; and*

*a receiver configured to receive, at the user equipment, a message requesting the user equipment to re-register with the communication system, wherein the message is responsive to at least a current registration of the user equipment set to expire in a predetermined time, wherein the transmitter is configured to cause, in response to the message, the user equipment to re-register with the control entity in the communication system, wherein the user equipment is re-authenticated when the user equipment is re-registered, wherein the re-registration of the user equipment is carried out without dropping existing sessions associated with the user equipment.*

*74. The apparatus of claim 73, wherein the message comprises a session initiation protocol NOTIFY message.*

*75. The apparatus of claim 73, wherein re-registration comprises re-authentication.*

*76. An apparatus, comprising:*

*a transmitter configured to send a registration message to register a user equipment with a control entity in a*

*communication system, the control entity implemented as a serving call state control function; and*

*a receiver configured to receive, at the user equipment, a message requesting the user equipment to re-register with the communication system, wherein the message responsive to at least one or more error conditions in the communication system, wherein the transmitter is configured to cause, in response to the message, the user equipment to re-register with the control entity in the communication system, wherein the user equipment is re-authenticated when the user equipment is re-registered, wherein the re-registration of the user equipment is carried out without dropping existing sessions associated with the user equipment.*

*77. The apparatus of claim 76, wherein the message comprises a session initiation protocol NOTIFY message.*

*78. The apparatus of claim 76, wherein re-registration comprises re-authentication.*

*79. An apparatus, comprising:*

*a transmitter configured to send a registration message to register a user equipment with a control entity in a communication system, the control entity implemented as a serving call state control function; and*

*a receiver configured to receive, at the user equipment, a message requesting the user equipment to re-register with the communication system, wherein the message is responsive to at least one or more error conditions in the control entity, wherein the transmitter is configured to cause, in response to the message, the user equipment to re-register with the control entity in the communication system, wherein the user equipment is re-authenticated when the user equipment is re-registered, wherein the re-registration of the user equipment is carried out without dropping existing sessions associated with the user equipment.*

*80. The apparatus of claim 79, wherein the message comprises a session initiation protocol NOTIFY message.*

*81. The apparatus of claim 79, wherein re-registration comprises re-authentication.*

*82. An apparatus, comprising:*

*a transmitter configured to send a registration message to register a user equipment with a control entity in a communication system, the control entity implemented as a serving call state control function; and*

*a receiver configured to receive, at the user equipment, a message requesting the user equipment to re-register with the communication system, wherein the message is responsive to at least the control entity mistrusting the user equipment, wherein the transmitter is configured to cause, in response to the message, the user equipment to re-register with the control entity in the communication system, wherein the user equipment is re-authenticated when the user equipment is re-registered, wherein the re-registration of the user equipment is carried out without dropping existing sessions associated with the user equipment.*

*83. The apparatus of claim 82, wherein the message comprises a session initiation protocol NOTIFY message.*

*84. The apparatus of claim 82, wherein re-registration comprises re-authentication.*

*85. An apparatus comprising:*

*at least one processor; and*

*at least one memory including code, which when executed by the at least one processor provide operations comprising:*

*sending, by a user equipment, a registration message to register the user equipment with a control entity in a communication system, the control entity implemented as a serving call state control function;*

*receiving at the user equipment a message requesting the user equipment to re-register with the communication system, wherein the message is responsive to at least one of a plurality of specified conditions; and*

*causing, in response to the message, the user equipment to re-register with the control entity in the communication system, wherein the user equipment is re-authenticated when the user equipment is re-registered,*

*wherein the re-registration of the user equipment is carried out without dropping existing sessions associated with the user equipment.*

*86. The apparatus of claim 85, wherein the message comprises a session initiation protocol NOTIFY message.*

*87. The apparatus of claim 85, wherein re-registration comprises re-authentication.*

*88. An apparatus comprising:*

*at least one processor; and*

*at least one memory including code, which when executed by the at least one processor provide operations comprising:*

*sending, by a user equipment, a registration message to register the user equipment with a control entity in a communication system, the control entity implemented as a serving call state control function;*

*receiving at the user equipment a message requesting the user equipment to re-register with the communication system, wherein the message is responsive to at least a current registration of the user equipment set to expire in a predetermined time; and*

*causing, in response to the message, the user equipment to re-register with the control entity in the communication system, wherein the user equipment is re-authenticated when the user equipment is re-registered,*

*wherein the re-registration of the user equipment is carried out without dropping existing sessions associated with the user equipment.*

*89. The apparatus of claim 88, wherein the message comprises a session initiation protocol NOTIFY message.*

*90. The apparatus of claim 88, wherein re-registration comprises re-authentication.*

*91. An apparatus comprising:*

*at least one processor; and*

*at least one memory including code, which when executed by the at least one processor provide operations comprising:*

*sending, by a user equipment, a registration message to register the user equipment with a control entity in a communication system, the control entity implemented as a serving call state control function;*

*receiving at the user equipment a message requesting the user equipment to re-register with the communication system, wherein the message responsive to at least one or more error conditions in the communication system; and*

*causing, in response to the message, the user equipment to re-register with the control entity in the communication system, wherein the user equipment is re-authenticated when the user equipment is re-registered,*

*wherein the re-registration of the user equipment is carried out without dropping existing sessions associated with the user equipment.*

*92. The apparatus of claim 91 wherein the message comprises a session initiation protocol NOTIFY message.*

*93. The apparatus of claim 91, wherein re-registration comprises re-authentication.*

*94. An apparatus comprising:*

*at least one processor; and*

*at least one memory including code, which when executed by the at least one processor provide operations comprising:*

*sending, by a user equipment, a registration message to register the user equipment with a control entity in a communication system, the control entity implemented as a serving call state control function;*

*receiving at the user equipment a message requesting the user equipment to re-register with the communication system, wherein the message is responsive to at least one or more error conditions in the control entity; and*

*causing, in response to the message, the user equipment to re-register with the control entity in the communication system, wherein the user equipment is re-authenticated when the user equipment is re-registered,*

*wherein the re-registration of the user equipment is carried out without dropping existing sessions associated with the user equipment.*

*95. The apparatus of claim 94, wherein the message comprises a session initiation protocol NOTIFY message.*

*96. The apparatus of claim 94, wherein re-registration comprises re-authentication.*

*97. An apparatus comprising:*

*at least one processor; and*

*at least one memory including code, which when executed by the at least one processor provide operations comprising:*

*sending, by a user equipment, a registration message to register the user equipment with a control entity in a communication system, the control entity implemented as a serving call state control function;*

*receiving at the user equipment a message requesting the user equipment to re-register with the communication system, wherein the message is responsive to at least the control entity mistrusting the user equipment; and*

*causing, in response to the message, the user equipment to re-register with the control entity in the communication system, wherein the user equipment is re-authenticated when the user equipment is re-registered,*

*wherein the re-registration of the user equipment is carried out without dropping existing sessions associated with the user equipment.*

*98. The apparatus of claim 97, wherein the message comprises a session initiation protocol NOTIFY message.*

*99. The apparatus of claim 97, wherein re-registration comprises re-authentication.*

*100. A computer-readable medium encoded with instructions that, when executed on a computer, perform a process, the process comprising:*

*sending, by a user equipment, a registration message to register the user equipment with a control entity in a communication system, the control entity implemented as a serving call state control function;*

*receiving at the user equipment a message requesting the user equipment to re-register with the communication system, wherein the message is responsive to at least one of a plurality of specified conditions; and*

*causing, in response to the message, the user equipment to re-register with the control entity in the communication system, wherein the user equipment is re-authenticated when the user equipment is re-registered,*

*wherein the re-registration of the user equipment is carried out without dropping existing sessions associated with the user equipment.*

*101. The computer-readable medium of claim 100, wherein the message comprises a session initiation protocol NOTIFY message.*

*102. The computer-readable medium of claim 100, wherein the re-registration further comprises the re-authentication.*

*103. A computer-readable medium encoded with instructions that, when executed on a computer, perform a process, the process comprising:*

*sending, by a user equipment, a registration message to register the user equipment with a control entity in a communication system, the control entity implemented as a serving call state control function;*

*receiving at the user equipment a message requesting the user equipment to re-register with the communication system, wherein the message is responsive to at least a current registration of the user equipment set to expire in a predetermined time; and*

*causing, in response to the message, the user equipment to re-register with the control entity in the communication system, wherein the user equipment is re-authenticated when the user equipment is re-registered,*

*wherein the re-registration of the user equipment is carried out without dropping existing sessions associated with the user equipment.*

*104. The computer-readable medium of claim 103, wherein the message comprises a session initiation protocol NOTIFY message.*

*105. The computer-readable medium of claim 103, wherein the re-registration further comprises the re-authentication.*

*106. A computer-readable medium encoded with instructions that, when executed on a computer, perform a process, the process comprising:*

*sending, by a user equipment, a registration message to register the user equipment with a control entity in a communication system, the control entity implemented as a serving call state control function;*

*receiving at the user equipment a message requesting the user equipment to re-register with the communication system, wherein the message responsive to at least one or more error conditions in the communication system; and*

*causing, in response to the message, the user equipment to re-register with the control entity in the communication system, wherein the user equipment is re-authenticated when the user equipment is re-registered,*

*wherein the re-registration of the user equipment is carried out without dropping existing sessions associated with the user equipment.*

*107. The computer-readable medium of claim 106, wherein the message comprises a session initiation protocol NOTIFY message.*

*108. The computer-readable medium of claim 106, wherein the re-registration further comprises the re-authentication.*

*109. A computer-readable medium encoded with instructions that, when executed on a computer, perform a process, the process comprising:*

*sending, by a user equipment, a registration message to register the user equipment with a control entity in a communication system, the control entity implemented as a serving call state control function;*

*receiving at the user equipment a message requesting the user equipment to re-register with the communication system, wherein the message is responsive to at least one or more error conditions in the control entity; and*

*causing, in response to the message, the user equipment to re-register with the control entity in the communication system, wherein the user equipment is re-authenticated when the user equipment is re-registered,*

*wherein the re-registration of the user equipment is carried out without dropping existing sessions associated with the user equipment.*

*110. The computer-readable medium of claim 109, wherein the message comprises a session initiation protocol NOTIFY message.*

*111. The computer-readable medium of claim 109, wherein the re-registration further comprises the re-authentication.*

*112. A computer-readable medium encoded with instructions that, when executed on a computer, perform a process, the process comprising:*

*sending, by a user equipment, a registration message to register the user equipment with a control entity in a communication system, the control entity implemented as a serving call state control function;*

*receiving at the user equipment a message requesting the user equipment to re-register with the communication system, wherein the message is responsive to at least the control entity mistrusting the user equipment; and*

*causing, in response to the message, the user equipment to re-register with the control entity in the communication system, wherein the user equipment is re-authenticated when the user equipment is re-registered,*

*wherein the re-registration of the user equipment is carried out without dropping existing sessions associated with the user equipment.*

*113. The computer-readable medium of claim 112, wherein the message comprises a session initiation protocol NOTIFY message.*

*114. The computer-readable medium of claim 112, wherein the re-registration further comprises the re-authentication.*

* * * * *